United States Patent Office 2,854,325
Patented Sept. 30, 1958

2,854,325
HERBICIDAL PROCESS AND COMPOSITION

Norman Edward Searle, Wilmington, Del., assignor to E. I. du Pont de Nemours and Company, Wilmington, Del., a corporation of Delaware No Drawing. Application January 17, 1957
Serial No. 634,623

6 Claims. (Cl. 71—2.6)

This invention relates to novel thiolbenzoic acids having at least three chlorine atoms on the benzene ring and functional derivatives of these acids. The invention is also directed to herbicidal compositions containing these novel compounds and to methods employing these compounds.

The search for compounds that exert profound and selective influence upon the growth of plants is of great importance. In recent years, certain organic compounds have been found to exert plant growth regulant properties. Illustrative of such compounds are esters of 2,4-dichlorophenoxyacetic acid which have been used with considerable economic advantage to control broad-leaved weeds.

One of the classes of compound suggested as herbicides is the polychlorobenzoic acids, e. g., trichlorobenzoic acid. The latter compound has some deficiencies for this application. It is volatile and not very rapid in its plant growth regulating properties.

It is an object of this invention to produce novel thiolbenzoic acids and derivatives thereof having 3 to 5 chlorine atoms on the benzene ring. It is a further object of this invention to produce compounds which are effective plant growth regulants and herbicides for both broad-leaved and grass-type weeds. Still a further object is the preparation of novel herbicidal formulations containing these novel compounds. These and further objects will become apparent from the disclosure.

The novel compounds of the invention are thiolbenzoic acids having 3 to 5 chlorine atoms on the benzene rings and the salts, anhydrosulfides, disulfides, and hydrocarbyl esters thereof. These compounds, which can be represented by the following formula

wherein X is hydrogen, hydrocarbyl of not more than 6 carbon atoms, a salt-forming cationic group, or a radical of the group

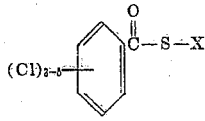

and

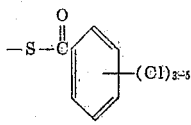

have been found to possess outstanding herbicidal activity.

The novel chlorinated thiolbenzoic acids of this invention can be prepared by reacting a polychlorinated benzoyl halide with an alkali metal hydrosulfide and freeing the acid from the salt. Esters, anhydrosulfides and disulfides are readily obtainable from the acids.

The following examples serve to illustrate the preparation of the new compounds of this invention

EXAMPLE 1

*2,3,6-trichlorothiolbenzoic acid*

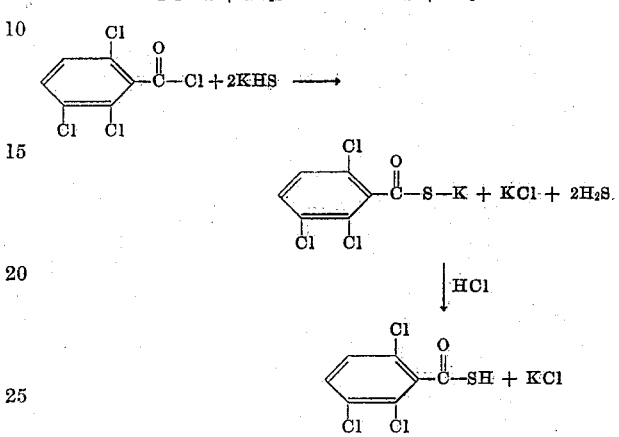

A solution of 82.8 grams of 85% potassium hydroxide in 500 ml. of 85% ethanol was saturated with hydrogen sulfide at 0–4° C. during a period of one hour. With stirring and sufficient cooling to maintain the temperature at 3–9° C., 139.0 grams of 2,3,6-trichlorobenzoyl chloride was added over a period of 43 minutes. The mixture was stirred for an additional one-half hour, and finally it was warmed at 28–30° C. for 15 minutes.

The reaction product was cooled to 5° C., diluted with 500 ml. of cold water, and the solution acidified to pH 1 by the addition of 135 ml. of cold concentrated hydrochloric acid. The yellow oil was separated, and the aqueous phase was extracted seven times with 50-ml. portions of methylene chloride. The combined oil and methylene chloride extracts were washed six times with 200-ml. portions of water and dried over sodium sulfate. The solution was filtered, and the clear filtrate was concentrated on the steam bath at a temperature no higher than 45° C. under a jet of nitrogen. The remaining solvent was removed in a small distilling flask at 50° C./0.10 mm. Final traces of solvent were removed at 30–40° C./0.05 mm. The yield was 134.1 grams (98%) of yellow, somewhat viscous oil; $n_D^{25}$ 1.6188.

*Analysis.*—Calcd. for $C_7H_3Cl_3OS$: C, 34.8; H, 1.25; S, 13.2. Found: C, 34.8; H, 1.34; S, 13.4.

Other thiol acids can be produced using the above process. Thus 2,3,5-trichlorothiolbenzoic acid, 2,3,4,6-tetrachlorothiolbenzoic acid, 2,3,5,6-tetrachlorothiolbenzoic acid and 2,3,4,5,6-pentachlorothiolbenzoic acid can be prepared by the reaction of the appropriate benzoyl chloride having 3 to 5 nuclear chlorines with an alkali or alkaline earth metal hydrosulfide preferably at temperatures of 0–50° C.

The hydrosulfides which can be used are the alkali and alkaline earth metal hydrosulfides and include sodium, potassium, calcium and magnesium hydrosulfide. They can be formed as exemplified above by the reaction of hydrogen sulfide with the appropriate alkali or alkaline earth metal hydroxide.

Benzoyl halides such as the chlorides, bromides and iodides can be employed for the reaction in the preceding example. However, the benzoyl chlorides are preferred since they are cheaper and more readily made. The preparation of benzoyl halides is described in the copending application Ser. No. 622,235.

EXAMPLE 2

Bis-(2,3,6-trichlorobenzoyl) disulfide

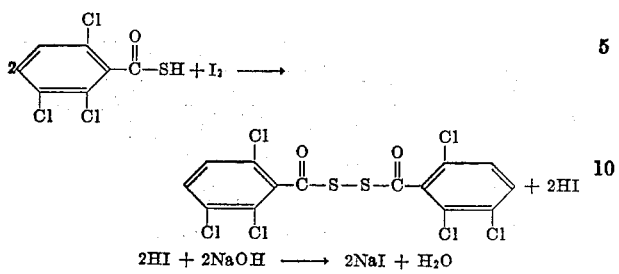

2HI + 2NaOH ⟶ 2NaI + H₂O

A solution of 29.0 grams of 2,3,6-trichlorothiolbenzoic acid (obtained as described in Example 1) in 175 ml. of methylene chloride was mixed with 175 ml. of water and stirred vigorously while iodine was added in approximately 2-gram portions until the brown color persisted in the water layer. The temperature was controlled at about 25° C. The initial pH of the mixture was approximately 1. The pH was raised by addition of 10% sodium hydroxide solution to about 5 or 6, at which point the color was discharged. After the addition of 15.9 grams of iodine, the brown color persisted at a pH above 5, indicating completion of the oxidation and the presence of a slight excess of iodine. The brown color was discharged by adjusting the pH to 1 and adding approximately 1 gram of sodium bisulfite. After vigorous stirring both layers became water-white.

The reaction mixture was made slightly alkaline (pH 8), and the methylene chloride layer was separated and washed three times with 200-ml. portions of water. A slightly pink coloration was again discharged with a small amount of sodium bisulfite. After drying over sodium sulfate, the solvent was removed in vacuo. The product crystallized on standing. Recrystallization from 250-ml. of n-propanol yielded 18.5 grams (54%) of fine white crystals, which melted at 128–129° C. after shrinking at 127° C.

*Analysis.*—Calcd. for $C_{14}H_4Cl_6O_2S_2$: C, 35.0; H, 0.84; S, 13.3. Found: C, 35.3; H, 0.83; S, 13.5.

The method of preparing the disulfides as exemplified in Example 2 can be used to prepare other disulfides from the thiol acids. Thus bis-(2,3,5,6-tetrachlorobenzoyl)disulfide and bis(2,3,4,5,6-pentachlorobenzoyl)disulfide can be prepared by oxidizing the appropriate chlorothiolbenzoic acid.

While the latter example specifically illustrates the use of iodine as the oxidizing agent, other agents such as chlorine, hydrogen peroxide, sodium tetrathionate, and dilute nitric acid will also produce the disulfides from the corresponding thiol acid.

Closely related derivatives of the thiol acids which are equally suitable for the purposes of this invention are the anhydrosulfides. They are readily obtained by reacting the thiol acid with the acid halide. Thus the reaction of 2,3,6-trichlorobenzoylchloride with 2,3,6-trichlorothiolbenzoic acid yields the corresponding polychlorobenzoyl anhydrosulfide. This reaction is illustrated in the following equation:

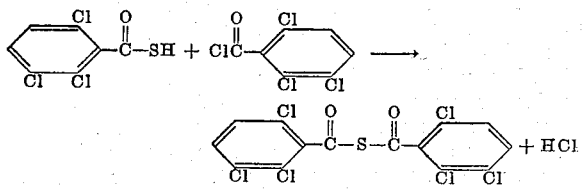

This general method can be used to prepare other anhydrosulfides from other thiol acids and acid halides. Temperatures of 0–50° C. are preferred for the preparation of the disulfides and anhydrosulfides.

Hydrocarbyl esters of polychlorinated thiolbenzoic acids are also suitable for the purposes of this invention. The preferred hydrocarbyl esters are the 1–6 carbon atom lower alkyl esters. The general method for preparing these esters is by the reaction of the appropriate polychlorobenzoyl halide with a mercaptan as illustrated by the following equation wherein R is a hydrocarbyl radical:

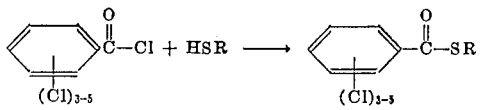

Methyl 2,3,6-trichlorothiolbenzoate, phenyl 2,3,5,6-tetrachlorothiolbenzoate, and n-butyl 2,3,4,5,6-pentachlorothiolbenzoate are typical of the esters which can be prepared by this process.

Equivalent to the thiol acids particularly for use in weed control formulations are the polychlorothiolbenzoic acid salts. Such salts are readily prepared by reaction of an appropriate inorganic base such as sodium carbonate, potassium carbonate, or calcium hydroxide with molecular equivalent amounts of a thiol acid to yield the corresponding sodium, potassium or calcium salts. An alternative method of preparing the salts is that shown in Example 1 wherein one mole of 2,3,6-trichlorobenzoyl chloride acid is reacted with 2 moles of potassium hydrosulfide to yield a potassium salt of 2,3,6-trichlorothiolbenzoic acid. Ammonium salts are likewise useful. Included are the following: Ammonium 2,3,6-trichlorothiolbenzoate, dimethylammonium 2,3,6-trichlorothiolbenzoate, triethylammonium 2,3,5,6 - tetrachlorothiolbenzoate, triethanolammonium pentachlorothiolbenzoate and the isobutylammonium salt of 2,3,6-trichlorothiolbenzoic acid.

The polychlorinated benzoyl halides employed as starting materials for the preparation of thiol-containing derivatives are obtained by the reaction of thionyl halides such as thionyl chloride, phosphorus tribromide, trichloride or pentachloride with the corresponding benzoic acid. Illustrative of this general process is the reaction between 2,3,6-trichlorobenzoic acid and thionyl chloride. 2,3,6-trichlorobenzoic acid (225.5 parts) was combined with 500 parts of thionyl chloride and heated to reflux. After fractional distillation to remove thionyl chloride, there was obtained 210 parts of 2,3,6-trichlorobenzoyl chloride boiling at 85–87° C. at 0.8 mm. Substitution in this general procedure of the 2,3,6-trichlorobenzoic acid by 2,3,5,6- and 2,3,4,6-tetrachlorobenzoic acid yields the corresponding benzoyl chlorides.

Of these new polychlorothiolbenzoic acids or derivatives as heretofore defined, those having 3 and 4 chlorine atoms attached to the benzene ring are preferred from the standpoint of solubility and superior utility for plant growth regulant activity. In contrast to the high order of activity exhibited by the compounds of this invention, thiol compounds containing less than three chlorine atoms per benzene ring are considerably inferior in their plant regulant properties.

The new polyhalogenated thiolbenzoic acids and their derivatives can be obtained in a variety of forms. The acids and esters are generally high-boiling liquids while the salts, disulfides and anhydrosulfides are generally crystalline solids. Except for certain of the salts, they are generally insoluble in water.

In use, these compounds can be applied in a number of ways. Generally they are formulated by mixture with a conventional carrier material or conditioning agent. This provides a formulation adapted for ready and efficient application to soil, weeds or unwanted plants using conventional applicator equipment. Thus, for the practice of the present invention these compounds can be formulated into a herbicidal composition such as described in Todd U. S. Patents 2,655,444 through 2,655,447.

Pest control adjuvants such as dusts, solvents, wetting, dispersing and emulsifying agents set out in U. S. Patent 2,426,417 can be employed in preparing the herbicidal compositions of the present invention. Other wetting, dispersing and emulsifying agents such as those listed in detail in Bulletin E607 of the Bureau of Entomology and Plant Quarantine of the U. S. Department of Agriculture and such as those set out in an article by McCutcheon in "Soap and Chemical Specialties," July through September 1955, entitled "Synthetic detergents and emulsifiers," can also be used and are collectively known to the art as surface active agents.

Preferred herbicidal compositions of the present invention are in the form of water-dispersible powders. They can be prepared by admixing one or more of the active compounds with a surface active agent and a finely divided solid carrier such as talc, pyrophyllite, natural clays, diatomaceous earth and other powdered diluents such as those set out in the aforementioned patents. The surface active agents are used in amounts sufficient to impart water-dispersibility to the powder.

Dust compositions can be prepared by admixing one or more of the active compounds with a finely divided carrier such as those set forth in the aforementioned patents.

Liquid herbicidal compositions can be prepared by intimately dispersing one or more of the active compounds in conventional organic liquid herbicidal carriers.

The herbicidal method of the present invention comprises applying a compound of the invention, ordinarily in a herbicidal composition of the aforementioned type to the locus or area to be protected from undesirable plant growth. The active compound is of course applied in sufficient amount to exert the desired herbicidal action. The application can be made directly upon the locus or area and the vegetation thereon during the period of infestation. Alternatively, the application can be made in advance of an anticipated weed infestation.

The dosage employed can be determined readily by those skilled in the art by conventional techniques. It is of course dependent upon the particular active ingredient employed and the nature of the formulation used, the type of treatment, the type of vegetation to be controlled, climatic conditions, and the like. In general when applied as a foliar spray a dosage of about 20-60 pounds of the active ingredient per acre is used.

This method is applicable to the control of both broad-leaved and grassy, annular and perennial weeds such as yellow foxtail, crabgrass, Johnson grass, wild mustard, dandelion, lamb's quarters, rough pigweed, and buckhorn plantain. It has particular utility as a soil sterilant for the control of weeds. Also it is outstandingly effective in controlling the perennial woody vines such as Virginia creeper, honeysuckle, trumpet vine and the like. The following examples serve to illustrate the herbicidal compositions of the invention and methods of application.

EXAMPLE 3

2,3,6-trichlorothiolbenzoic acid was formulated as follows with "Velsicol" AR-50 (a commercially available alkylated naphthalene) for use in field application as an herbicide.

A mixture of 52.3 grams of 2,3,6-trichlorothiolbenzoic acid and 55.0 grams of "Velsicol" AR-50 was heated with stirring at 60° C.±3° C. for one-half hour under a blanket of nitrogen. The yellow solution that was produced contained 49% by weight of the thiol acid. This composition was extended with 40 gallons of Diesel oil and applied at the rate of 50 lbs./acre (based on the active ingredient) with a hand operated pressure sprayer to an area along a fence row. Excellent kill of both broad-leaf and grass weeds was obtained.

EXAMPLE 4

The following herbicidal compositions are formulated by blending the following listed ingredients together in a ribbon blender then micropulverizing until substantially all of the particles are below 50 microns in diameter.

|   | Percent |
|---|---|
| (A) 2,3,6-trichlorothiolbenzoic acid | 25 |
| Polyoxyethylene esters of mixed fatty and resin acids | 2 |
| Attapulgite clay | 73 |
| (B) 2,3,5-trichlorothiolbenzoic acid | 50 |
| Polyoxyethylene esters of mixed fatty and resin acids concentrated with urea | 3 |
| Synthetic fine silica | 47 |

These compositions are then extended with water to form sprayable formulations containing 1% by weight of the active ingredient. When applied at a dosage of 60 pounds per acre of the active ingredient to an area infested with a wide variety of weeds including crabgrass, yellow foxtail, Johnson grass, trumpet vine, and honeysuckle, ragweed and dandelion, excellent weed control is obtained.

EXAMPLE 5

The following herbicidal composition is prepared by blending together the listed ingredients in a ribbon blender and then micropulverizing until substantially all of the particles are below 50 microns in diameter.

|   | Percent |
|---|---|
| 2,3,6-trichlorothiolbenzoic acid, sodium salt | 75 |
| Alkyl naphthalene sulfonic acid, Na salts | 0.75 |
| Low viscosity methyl cellulose | 0.25 |
| Synthetic fine silica | 24 |

This composition when extended with water and applied to weed infested areas in accordance with the procedure of the previous example gives excellent weed control.

EXAMPLE 6

The following emulsifiable oil is prepared by simple mixing of the three components listed. It may be diluted with either oil or water before application.

|   | Percent |
|---|---|
| bis(2,3,6-trichlorobenzoyl)disulfide | 25 |
| Mixed polyoxyethylene modified fatty amines | 5 |
| Xylene | 70 |

This formulation is emulsified by adding 240 pounds of the composition to 300 gallons of water. It is applied at the rate of 60 pounds per acre (active ingredient) by using conventional spray equipment. Outstanding control of broad-leaved and grassy weeds, woody brush and vines is achieved for an extended period of time. No undesirable effects are noted on desirable foliage growing adjacent to the treated area.

EXAMPLE 7

|   | Percent |
|---|---|
| 2,3,6-trichlorothiolbenzoic acid, methylester | 15 |
| Mixed polyoxyethylene esters of fatty acids and oil soluble petroleum sulfonates | 5 |
| Diesel oil | 80 |

The above ingredients are thoroughly mixed until a homogeneous oil formulation results. This formulation is then diluted with diesel oil. It is then sprayed at the rate of 50 lbs./acre of the active ingredient in 100 gallons of diesel oil onto weed infested areas along a railroad right-of-way. Excellent control of undesirable vegetation is obtained.

EXAMPLE 8

|   | Percent |
|---|---|
| 2,3,5,6-tetrachlorothiolbenzoic acid | 10 |
| Diatomaceous silica | 20 |
| Micaceous talc | 70 |

The active ingredient and diatomaceous silica are first blended and micropulverized. The product is then blended with the major diluent in a ribbon blender to yield a dust suitable for application with conventional dusting equipment.

The composition is then applied at a rate of 600 lb. per acre of the formulated product for the control of broad-leaved and grassy weeds around telephone poles and bridge abutments. Excellent weed control is obtained.

I claim:

1. The method for the control of weeds which comprises applying to a locus to be protected in an amount sufficient to exert a herbicidal effect, a compound of the group consisting of thiolbenzoic acid having 3–5 chlorine atoms on the benzene ring and the salts, anhydrosulfides, disulfides and 1–6 carbon atom hydrocarbyl esters thereof.

2. A herbicidal composition comprising a herbicidal adjuvant and in a herbicidally effective amount a compound of the group consisting of thiolbenzoic acid having 3–5 chlorine atoms on the benzene ring and the salts, anhydrosulfides, disulfides and 1–6 carbon atom hydrocarbyl esters thereof.

3. A compound of the group consisting of thiolbenzoic acids having 3–5 chlorine atoms on the benzene ring and the salts, anhydrosulfides, disulfides, and 1–6 carbon atom hydrocarbyl esters thereof.

4. A compound of the following formula

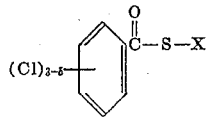

wherein X is selected from the group consisting of hydrogen, hydrocarbyl of not more than 6 carbon atoms, salt-forming cations,

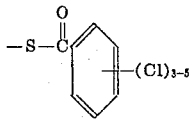

and

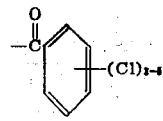

5. 2,3,6-trichlorothiolbenzoic acid.

6. A herbicidal composition comprising a herbicidal adjuvant and in a herbicidally effective amount a compound of the following formula

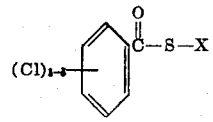

wherein X is selected from the group consisting of hydrogen, hydrocarbyl of not more than 6 carbon atoms, salt-forming cations,

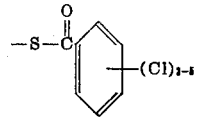

and

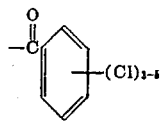

References Cited in the file of this patent

UNITED STATES PATENTS 2,655,444     Todd _____ Oct. 13, 1953
2,655,447     Todd _____ Oct. 13, 1953

OTHER REFERENCES

Beilstein's Handbuch, vierte Auflage, vol. 9, pp. 426–427 (1926).
Marshall: Chem. Abstract, vol. 49, col. 6528 (1956).
Sweet et al.: Chem. Abstract, vol. 49, col. 6528 (1956).